L. H. BRINKMAN.
APPARATUS FOR MAKING FLEXIBLE TUBES.
APPLICATION FILED SEPT. 7, 1915.
1,198,391.
Patented Sept. 12, 1916.
3 SHEETS—SHEET 1.
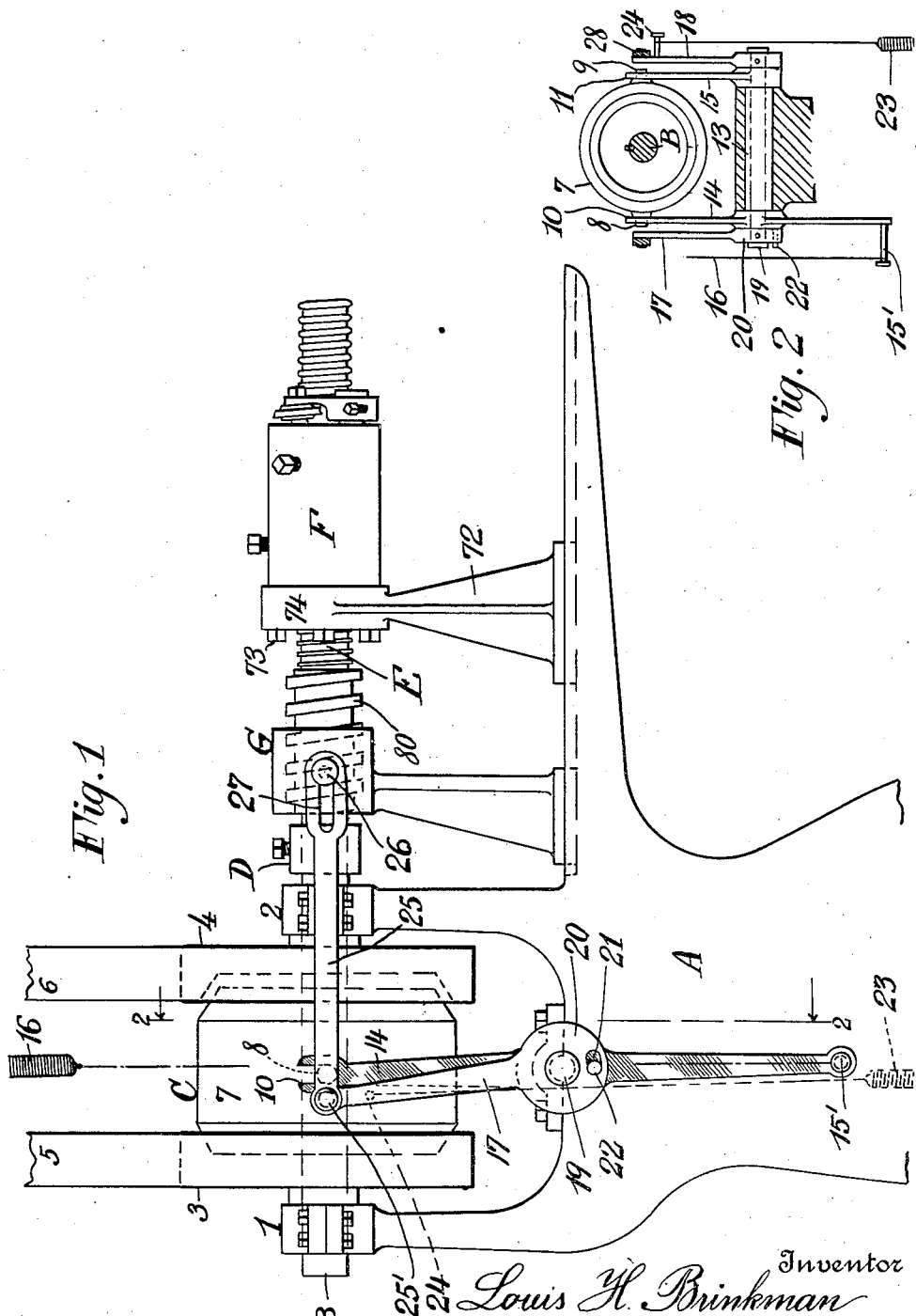

L. H. BRINKMAN.
APPARATUS FOR MAKING FLEXIBLE TUBES.
APPLICATION FILED SEPT. 7, 1915.
1,198,391.
Patented Sept. 12, 1916.
3 SHEETS—SHEET 2.
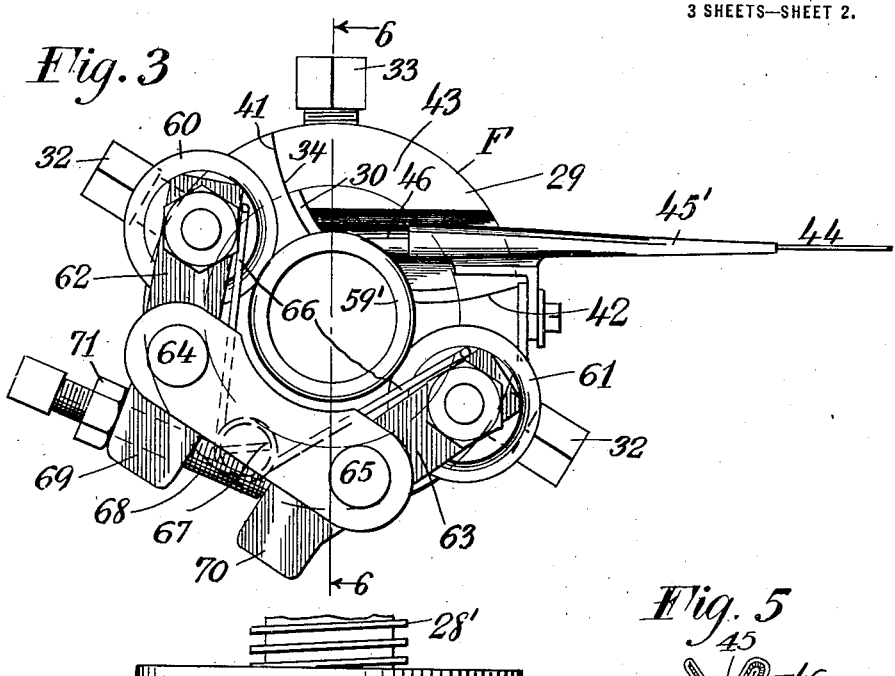
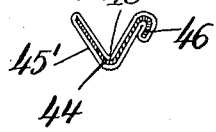
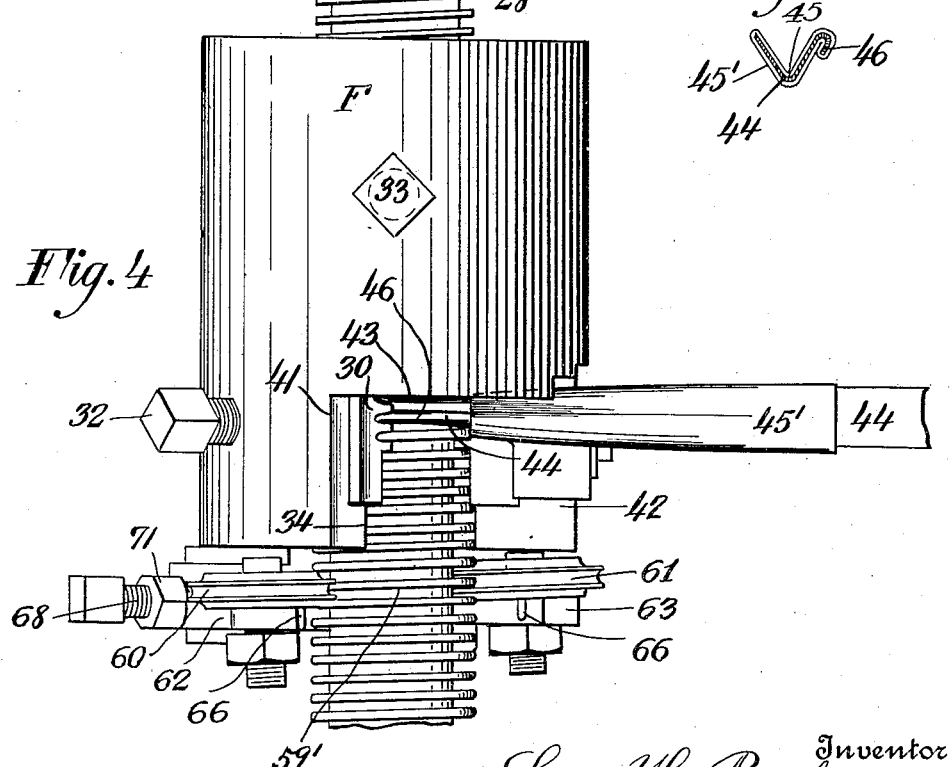
Louis H. Brinkman, Inventor
By his Attorney
Thomas Howe L. H. BRINKMAN.
APPARATUS FOR MAKING FLEXIBLE TUBES.
APPLICATION FILED SEPT. 7, 1915.
1,198,391.
Patented Sept. 12, 1916.
3 SHEETS—SHEET 3.
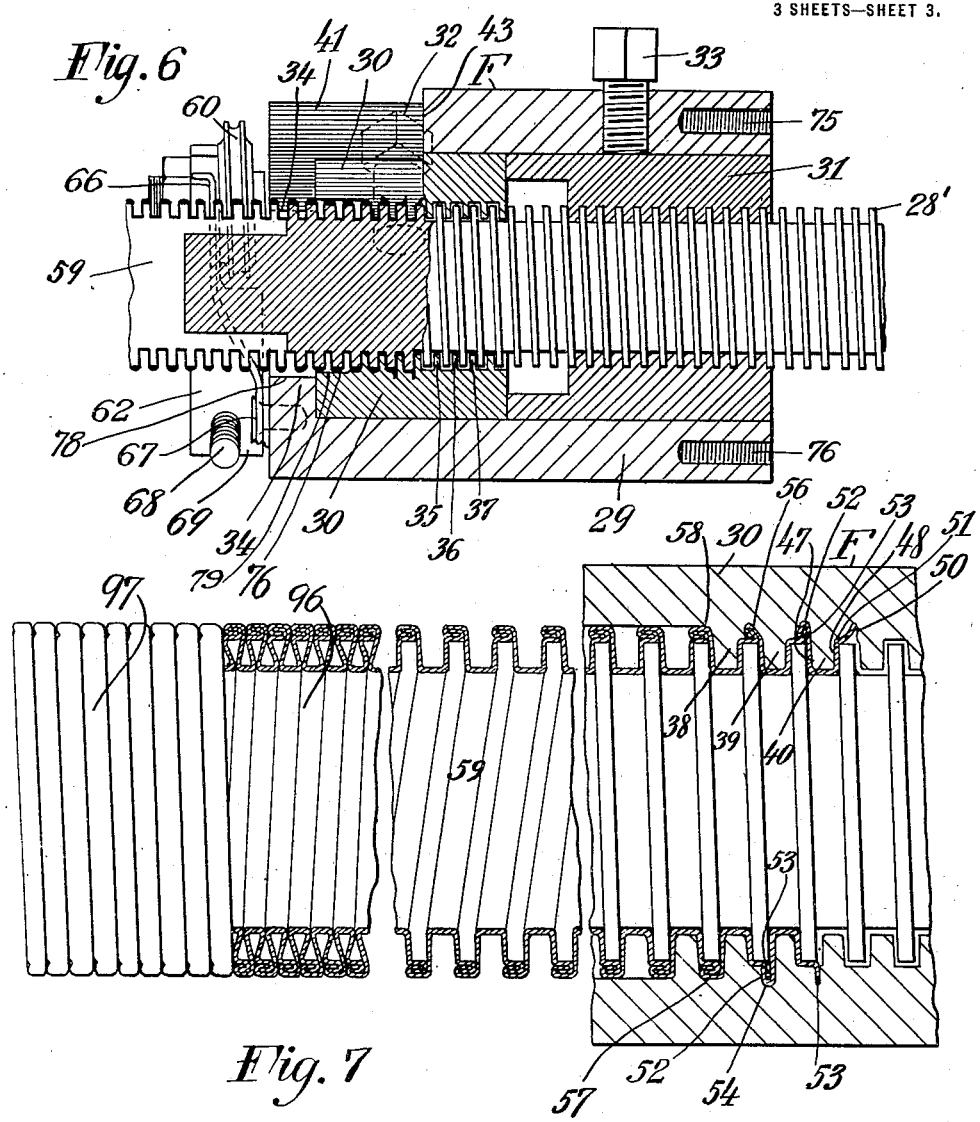
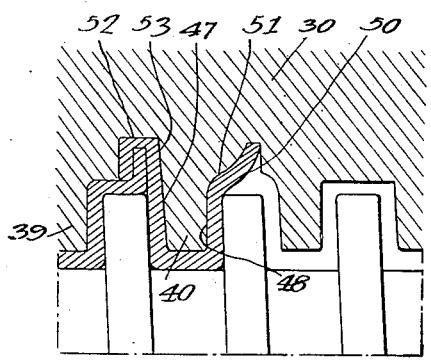
Louis H. Brinkman, Inventor
By his Attorney
Thomas Howe

UNITED STATES PATENT OFFICE.

LOUIS H. BRINKMAN, OF GLEN RIDGE, NEW JERSEY, ASSIGNOR TO TITEFLEX METAL HOSE CORPORATION, A CORPORATION OF NEW YORK.

APPARATUS FOR MAKING FLEXIBLE TUBES.

1,198,391.  Specification of Letters Patent.  Patented Sept. 12, 1916.

Application filed September 7, 1915.  Serial No. 49,257.

*To all whom it may concern:*

Be it known that I, LOUIS H. BRINKMAN, a citizen of the United States, and resident of Glen Ridge, in the county of Essex and State of New Jersey, have invented certain new and useful Apparatus for Making Flexible Tubes, of which the following is a specification.

This invention relates to means for manufacturing flexible tubes.

More particularly, the invention relates to the formation of a flexible tube from metal strip or ribbon.

Flexible tubes of the character with which this invention is concerned, are adapted to a wide variety of uses such, for instance, as pipes for the conduct of water, steam and other fluids, conduits for electric wires, etc. Where such flexible tubing is employed, elbows and other jointing devices at turning points are unnecessary and, generally speaking, the improved tubes are readily adaptable to such forms as may be required under different circumstances of installation without additional parts or special construction.

It has been proposed to manufacture flexible tubing from a strip or ribbon but, so far as I am aware, all of such proposals necessarily involve sliding at the joints to produce flexibility (and this requires packing to make a fluid tight joint), heat is required in their manufacture (which complicates the operation) and numerous other objections to previous strip-formed tubes exist as to disadvantages in manufacture, extent of life of the tube, or efficiency in use.

With the object of producing an improved tube therefore, I have devised an apparatus as explained in the following specification, in connection with the drawings and as particularly pointed out in the claims.

It may be stated therefore, that the main object of the invention is to provide apparatus for manufacturing a flexible tube from a strip or ribbon which shall realize many advantages as regards manufacture and use not hitherto attained with prior structures of this character.

A further and more specific object of the invention is to provide apparatus for helically forming a metal strip, interfolding the edges of adjacent convolutions and forming a bent section, preferably in the form of a groove, longitudinally of the strip to promote flexibility of the tube. Where the edges of the convolutions are interlocked to form a fluid tight joint, and are thus held in firm relationship, the groove furnishes practically all of the flexibility of the tube which would be substantially inflexible without it.

A further specific object of the invention is to reinforce or thicken the walls of a groove, extending longitudinally of a helical strip and having the edges of the convolutions joined together to form a flexible tube, so that upon flexing the tube the bend in the walls of the groove will be properly distributed so that the whole will be strengthened and no undue bending moment will come upon any particular location.

Other and ancillary objects of the invention will appear hereinafter.

In the accompanying drawings which illustrate the invention, Figure 1 is a side elevation of a machine embodying the invention, some of the extremities being omitted so as to bring the illustration properly within the compass of the sheet and which will be readily understood from the description, with some parts in section. Fig. 2 is a section on a reduced scale through the frame and headstock spindles on the line 2—2 of Fig. 1, looking in the direction of the arrow, the clutch and clutch shifting members being shown in elevation. Fig. 3 is an end elevation, on an enlarged scale, of the tube forming nut or die and its appurtenant apparatus. Fig. 4 is a top plan view of the same. Fig. 5 is an end view of the preliminary strip former feeding the strip into the forming threads of the die and screw, the view being of the end nearest the die and the strip emerging from the former being shown in section. Fig. 6 is a section on the line 6—6 of Fig. 3, looking in the direction of the arrows, and Fig. 7 is a still further enlarged sectional view of the tube and that portion of the nut directly involved in its formation, showing more clearly the details of construction of the tube and of its formation by the die and screw. Fig. 8 is a fragmentary longitudinal section of a portion of the nut and screw rod on an exaggerated scale so as to more clearly show the clearances.

Referring to the drawings, the apparatus comprises a support or frame A upon which is mounted a headstock comprising the rotatably mounted spindle B, the reversible driving mechanism C therefor and the chuck D. Within the chuck is secured a screw-rod E carrying a screw thread which coöperates with a longitudinally movable nut F to form the tube. Also the screw rod has a thread engaging with a longitudinally moving nut G for appropriately reversing the direction of rotation of the rod.

Referring to the drawings more in detail, the spindle B of the headstock is supported in the bearings 1 and 2 and rotatably mounted upon it are the belt pulleys 3 and 4 upon which run the belts 5 and 6 driven in opposite directions by any suitable source or sources of power. Splined upon the spindle is a movable clutch member 7 which may be slid longitudinally to alternately engage the pulleys 3 and 4.

In order to shift the movable clutch member to reverse the direction of rotation of the chuck and screw rod, and to securely hold it in the position to which it may be moved, the clutch member has extending laterally from it two trunnions 8 and 9 which are embraced by the forks 10 and 11 at the ends of a yoke journaled in the frame.

The yoke comprises a sleeve 13 to the ends of which the arms 14 and 15, carrying the forks 10 and 11, are fixed. The yoke is held in position to cause driving engagement with one of the pulleys 3 or 4 by an off-center spring 16 having one end secured at 15' to an extension of the arm 14, and the other end to a suitable stationary point.

To move the yoke, the arms 17 and 18 are fixed upon a shaft 19 which passes through and is rotatable in the sleeve 13. The arm 17 is provided with a disk 20 having a slot 21 which receives a pin 22 fixed to the extension of the arm 14 of the yoke. An off-center spring 23 has one end connected to the arm 18 at 24 and has its other end secured to a fixed point. The pin 22 and slot 21 provide a connection which permits movement of the arms 17 and 18 with relation to the yoke until the spring 23 has passed center. The arms and yoke are then thrown together quickly into the position for reverse rotation, the spring 23 being stronger than the spring 16. The spring 16 serves to hold the clutch in closed position during transition movements of the shifting mechanism. The arm 17 is moved in one direction or the other by means of a link 25 which is pivoted to the arm at 25' and is connected with the nut G by a pin 26 and slot 27. The slot permits quick movement of the arm 17 after its spring has passed dead center. A similarly connected link 28 extends between the arm 18 and the nut G upon the other side. Forward and backward movement of the nut G along the rod E operates to throw the clutch member from one extreme to the other so that the direction of rotation of the spindle, chuck and screw rod is reversed at regular intervals for a purpose as will hereinafter appear.

The parts directly concerned in the formation of the tube comprise the nut F coöperating with the threads 28' on the screw rod together with appurtenant appliances. The nut comprises a steel casing 29 having a central bore adapted to receive a steel die 30 and a brass bushing 31 closely fitting against it, the die and bushing being held in position and prevented from movement with relation to the casing by means of set screws 32 and 33 as shown. It will be observed that the bore just spoken of does not extend entirely through the casing but that there is a smaller bore at one end so that the flange 34 is formed against which the die abuts. The diameter of the bore inside this flange is such as to allow the passage of the tube as formed by the die and screw. The bushing 31 may be threaded to receive the rotating screw threads with a running clearance as shown to hold the die and screw in proper relative positions, and the steel die may have certain non-forming threads, as 35, 36, 37, etc., and it carries specially formed threads 38, 39 and 40 adapted to form the strip into the tube. After the tube forming threads have been passed the die has an unthreaded interior surface. To permit the strip of which the tube is formed to be fed into the die from the side, the casing 29 and the die have segments cut away as shown particularly in Figs. 3 and 4, forming a recess having side walls 41 and 42 and an end wall 43.

Secured to the wall 42 of the recess is a channel or former 45' for preliminarily shaping the ribbon prior to its introduction into the die. This former is flat at one end where it receives the flat ribbon 44 and at its other end is shaped as shown in Fig. 5. It will be observed that this former initiates a longitudinal groove 45 in the strip and one edge is curled over as shown at 46. The ribbon passes from the former 45' into the die, the bottom portion of the groove being between the top of the die thread 40 and the screw at the base of the screw threads. The sides 47 and 48 extend up on both sides of the die thread 40. The side 48 has its extremity 50 bent to one side in a channel cut in the die at the base of the thread. This channel is chamfered off at 51, at the beginning, to facilitate the entrance of the strip, but soon merges into the slot which is radial of the tube and contains the flange 53. The width of this slot is such as to be substantially equal to the thickness of the ribbon or strip of which the tube is formed. Similar clearances are formed between the screw and the die at the base of the die thread and also about the die thread 40 except that at the outer face of the die thread the clearance is made larger and the adjacent ends of the clearances at the sides of the thread are made larger, gradually tapering off to clearances at the base of the die thread which are substantially equal to the thickness of the ribbon, this arrangement of clearances being most clearly shown in the enlarged view Fig. 8. This increased clearance at the outer face of the die thread and at the sides as described, provides space for the swaging or thickening of the metal which takes place. This thickening of the bottom of the groove in the strip is of advantage as will be hereinafter again referred to. The curled over edge of the side 47 is entered within a channel 52 at the base of the die thread 40. This channel is of slightly more than the width of three thicknesses of ribbon at the start. The curled over portion received from the preliminary former is more sharply bent on entering the channel and consequently its tendency is to spring against the sides of the channel, leaving a clearance for one thickness of the ribbon between the sides of the bent over portion. Within this clearence is entered the edge 53 of the preceding convolution, this edge being radial of the tube and corresponding to the edge 50 of the convolution being considered. The strip maintains this sectional shape following the die thread 40 about the screw, except that the channel 52 is narrowed as it progresses about the screw so that the bent over edge of the strip and its embraced edge of the next convolution are pressed more closely together as shown at 54. The strip then emerges from the die into the recess and reënters the die about the die thread 39. The right hand side (as viewed in Figs. 6 and 7) is now embraced by the curled over portion of the edge of the succeeding convolution and its left hand edge, interfolded with the preceding convolution will enter within a channel 56 cut in the die at the thread base. This channel is formed at its beginning of a section as shown at 56 with an inclined wall which bends over the interfolded edges to one side. This section is gradually merged into the section as shown at 57 as it progresses about the die until the interlocked portions are bent down and occupy the position as shown at 57, the clearance between the die and thread being substantially equal to four thicknesses of the ribbon. In this condition the joined edges of the strip emerge from the die into the recess and are entered into a similarly shaped clearance 58 of similar depth between the die and screw threads. The joint may be then passed around the screw one or more times without changing form and the tube emerges from the nut having the sides of the groove in the strip substantially radial of the tube, the bottom of the groove upon the inside of the tube and the interfolded edges of contiguous convolutions of the strip at the outside of the groove, the section of the tube being then as shown at 59 and exterior elevation as at 59'. The tube then passes on between the grooved rollers 60 and 61 which bear upon the joint and bring the parts firmly together so as to insure a tight and shapely joint in case such has not been already accomplished, their pressure promoting the frictional grip of the screw on the strip. It will be observed that the rollers are set in a plane which makes an angle with the longitudinal axis of the tube corresponding to the helical pitch of the strip so that the rollers are adapted to the helical form of the joint. The rollers may conveniently be rotatably mounted upon arms 62 and 63 pivoted to the end of the casing of the nut at 64 and 65. These arms are engaged by the ends of a spring 66 which tends to throw them away from the tube, the spring being secured to the end of the nut casing at its center 67. The rollers are forced against the tube by means of a screw 68 tapped into the tail 69 of one of the arms 62 and bearing against the tail 70 of the other arm 63. Obviously by turning this screw in one direction or the other the pressure of the rollers upon the tube may be made any that is desired. A lock nut 71 on the screw provides for securing the arms and rollers in adjusted position. As the rollers bear against opposite sides of the tube they have no tendency to bend it to one side or the other.

The nut F as described, is secured to a stand or support 72 sliding upon the frame. This may be done by means of machine screws 73 passing through the head 74 and tapped into the nut casing, the casing being tapped for this purpose at 75, 76, etc. The head 74 has a central opening to permit the passage of the screw E. It will be observed that between the rollers and the end of the die threads there are several convolutions of the thread on the screw which have no corresponding threads on the die or nut casing, the die and casing presenting plain faces 78 and 79 to the screw threads.

It will now be apparent that the strip having been entered between the die and screw as indicated, the turning of the screw will frictionally grip the strip and draw it into the die so that a tube will be formed as described. The turning of the screw, however, causes the nut F to travel along the screw member, and unless the tube sections to be formed were very short, the apparatus would have to be very long to accommodate the travel of the nut. For this reason provision is made for returning the nut to its starting point at suitable intervals. This is the object of reversing the direction of rotation of the screw member as before referred to. In the case shown the forming thread on the screw member is a right hand thread, as is also the thread 80 for the nut G. As, therefore, the screw member is rotated in a clockwise direction, viewed from the head stock, the strip will be drawn in and the tube formed as described, the forming nut moving toward the head stock and the shifting nut G moving in the same direction. As the nut G moves back and forth it shifts the clutch as has been referred to.

The operation of the apparatus in its entirety may now be traced. The end of the metal is entered in the former 45' in which it has a groove initiated and one edge curled over as described. From the former it is entered within the die or nut at the first forming thread as described and, the screw being turned, the strip is passed through the forming threads of the die and on about the screw under the grooved rollers 62 and 63, when the tube emerges from the nut. As it enters the rollers it is of a longitudinal section as shown at 59. In passing through the forming channels, it will be observed that the clearances are such as to force the interfolded edges tightly together and the folding of one part about the other draws them tightly together at the bends so that a fixed, tight joint is formed. The form as shown in section at 59 may be the final form, and for some purposes may be best, but the tube may be compressed or reflexed later into a form, section of which is shown at 96. The exterior view of the tube is shown at 97.

Let it be assumed that the flat strip has been passed through forming channels of the die and further that the apparatus is in the phase of operation as indicated in Fig. 1. In this position the apparatus has just begun a tube forming period, the nut G is substantially at the extremity of its left hand movement (see Fig. 1) and the forming nut F is substantially at the left hand extremity of its movement. The driving clutch has been thrown to the left into engagement with the pulley 3 so that the belt 5 driving the pulley in a counter clock-wise direction, viewed from the left hand end, turns the screw rod in a similar direction. This will result in the withdrawal of the screw from the nut and from the tube or strip, the latter being backed off sufficiently to release the torsional gripping between it and the screw. The nut F then moves toward the right carrying with it the strip and tube, there being no turning of the latter in this movement. During this operation, the shifting nut G is also carried to the right. At a certain point in its travel, depending upon the adjustment, the clutch member operating levers are moved past center and the clutch member is thrown to the right into engagement with the pulley 4. It will be apparent that the arrangement of levers and off-center springs is such that the shifting of the clutch is brought about practically instantaneously so that there is no material discontinuance of the operation. The pulley 4 revolving in the opposite direction from that of the pulley 3, the direction of rotation of the screw will now be reversed. As the screw thus turns, the strip will be held to it by a torsional frictional grip so that it turns with the screw, the sufficiency of this frictional grip being insured by the extra turns of the strip about the screw in addition to those turns under the forming threads. The drawing of the strip in and through the nut operates to form a groove longitudinally of the strip, winds the strip into a helical form and interfolds the edges of adjacent convolutions, forcing these edges tightly together so that a fixed and fluid tight joint is formed. The tube then passes on under the rollers 60 and 61 as before described. During this operation, it being observed that the screw does not move longitudinally, the forming nut moves to the left (see Fig. 1) the screw and strip turning within it. This is kept up as long as the screw is turned in the direction indicated.

During the left hand travel of the forming nut the shifting nut G is carried to the left until, at a certain predetermined point, the driving clutch is again shifted to the position shown in the drawings. The parts of the machine will then occupy positions as shown in Fig. 1 and a cycle of operation has been completed and may be repeated indefinitely as long as it may be desired to operate the machine.

The tube, of section as shown at 59, as it delivered by the forming nut and screws, may be used as it is but if desired it may be compressed axially by passing a rod through it, the rod having nuts at the ends of the tube. Pressure is then brought to bear on the ends of the tube by turning the nuts and the tube may thus be compressed longitudinally. The groove walls thus be reflexed and the tube formed to have a longitudinal section as shown at 96 and an exterior as shown at 97. Also the tube might be compressed in a hydraulic press or in other suitable ways.

While the invention has been illustrated in what is considered its best embodiment, it may have other embodiments and is not therefore limited to the structure shown in the drawings.

What I claim is:

1. In an apparatus for forming a flexible tube from a strip, the combination of forming members consisting of a nut and a cooperating screw having clearances between them to receive the strip and one of said members having bending channels at the bases of the threads to receive the edges of the strip and interfold the same.

2. In an apparatus for forming a flexible tube from a strip, the combination of forming members consisting of a nut and cooperating screw having clearances between them to receive the strip and one of said members having bending channels adapted to receive the edges of the strip and interfold the same.

3. In an apparatus for forming a flexible tube from a strip, the combination of forming members consisting of a nut and a cooperating screw having clearances between them to receive the strip and one of said members having bending channels at the bases of the threads adapted to receive the edges of the strip and interfold the same, the clearances between the outer extremities of the threads on the member carrying the bending channels and thread base of its cooperating member being greater than between the sides of the threads.

4. In an apparatus for forming a flexible tube from a strip, the combination of forming members consisting of a nut and a cooperating screw having clearances and one of said members having bending channels, adapted to form a strip into a helix having the edges of adjacent convolutions interfolded and a helical groove, and rollers receiving the tube from between the screw and nut and bearing upon the tube.

5. In an apparatus for forming a flexible tube from a strip, the combination of forming members consisting of a nut and cooperating screw having clearances between them to receive the strip and one of said members having bending channels at the bases of the threads adapted to receive the edges of the strip and interfold the same, said screw having sufficient threads to produce frictional contact with the strip sufficient to draw the strip into and through the clearances between the nut and screw when they are relatively rotated.

6. In an apparatus for forming a flexible tube from a strip, the combination of forming members consisting of a nut and a cooperating screw having clearances between them to receive the strip and one of said members having bending channels at the bases of the threads adapted to receive the edges of the strip and interfold the same, the nut having a lateral opening through which the strip may be fed in between the nut and screw.

7. In an apparatus for forming a flexible tube from a strip, the combination of forming members consisting of a nut and a cooperating screw having clearances between them to receive the strip and one of said members having bending channels at the bases of the threads adapted to receive the edges of the strip and interfold the same, and threads in said nut and screw having a running fit.

8. In an apparatus for forming a flexible tube from a strip, the combination of forming members consisting of a nut and a cooperating screw having clearances between them to receive the strip and one of said members having bending channels at the bases of the threads adapted to receive the edges of the strip and interfold the same, and a preliminary former initiating a groove in and curling over one edge of the strip.

9. In an apparatus for forming a flexible tube from a strip, the combination of forming members consisting of a nut and a cooperating screw having clearances between them to receive the strip and one of said members having bending channels at the bases of the threads adapted to receive the edges of the strip and interfold the same, means for relatively moving the screw and nut and means for reversing such movement.

10. In an apparatus for forming a flexible tube from a strip, the combination of forming members consisting of a nut and a cooperating screw having clearances between them to receive the strip and one of said members having bending channels at the bases of the threads adapted to receive the edges of the strip and interfold the same, means for relatively moving the screw and nut and means controlled by movement of one of said members for reversing such movement.

11. In an apparatus for forming a flexible tube from a strip, the combination of forming members consisting of a nut and a cooperating screw having clearances between them to receive the strip and one of said members having bending channels at the bases of the threads adapted to receive the edges of the strip and interfold the same, said screw having sufficient threads to produce frictional contact with the strip sufficient to draw the strip into and through the clearances between the nut and screw when they are relatively rotated, the clearances being such as to permit the rotatable member to be withdrawn from the helical strip upon reversal of movement.

12. In an apparatus for forming a flexible tube from a strip, the combination of forming members consisting of a nut and a cooperating screw having clearances to receive the strip between them and one of said members having bending channels at the base of the threads, adapted to receive the edges of the strip and interfold the same, the threads on the member carrying the bending channels depressing a groove longitudinally of said strip, said depressing threads corresponding in cross-section to the section of the groove.

13. In an apparatus for forming a flexible tube from a strip, the combination with means for helically forming the strip, of means for bending the edges of adjacent convolutions together into interfolded relation, and means for forming a bend in a transverse section of the strip, said bend being formed between and independent of the interfolded edges.

14. In an apparatus for forming a flexible tube from a strip, the combination with means for helically forming the strip, of means for bending the edges of adjacent convolutions together into interfolded relation, and means for forming a longitudinal groove in the strip independent of and between the interfolded portions.

15. In an apparatus for forming a flexible tube from a strip, the combination of a relatively movable die and coöperating member having coöperating forming projections adapted to receive the strip between them, helically form it and bending the transverse section of the strip, and bending channels adapted to receive edges of adjacent convolutions and interfold the same.

16. In an apparatus for forming a flexible tube from a strip, the combination of forming members consisting of a nut and coöperating screw having clearances between them to receive the strip and one of said members having bending channels adapted to receive the edges of the strip and interfold the same, and means for turning the screw with relation to the nut.

17. In an apparatus for forming a flexible tube from a strip, the combination of forming members consisting of a nut and a coöperating screw having clearances between them to receive the strip and one of said members having bending channels at the bases of the threads adapted to receive the edges of the strip and interfold the same, said screw having sufficient threads to produce frictional contact with the stritp sufficient to draw the strip into and through the clearances between the nut and screw when they are relatively rotated, and means for turning the screw with relation to the nut.

18. In an apparatus for forming a flexible tube from a strip, the combination of forming members consisting of a nut and coöperating screw having clearances between them to receive the strip and one of said members having bending channels at the bases of the threads adapted to receive the edges of the strip and interfold the same, the nut having a lateral opening through which the strip may be fed in between the nut and screw, and means for turning the screw with relation to the nut.

19. In an apparatus for forming a flexible tube from a strip, the combination of forming members consisting of a nut and a coöperating screw having clearances between them to receive the strip and one of said members having bending channels at the bases of the threads adapted to receive the edges of the strip and interfold the same, and threads in said nut and screw having a running fit, and means for turning the screw with relation to the nut.

20. In an apparatus for forming a flexible tube from a strip, the combination of forming members consisting of a nut and a coöperating screw having clearances between them to receive the strip and one of said members having bending channels at the bases of the threads adapted to receive the edges of the strip and interfold the same, and a preliminary former initiating a groove in and curling over one edge of the strip, and means for turning the screw with relation to the nut.

21. In an apparatus for forming a flexible tube from a strip, the combination of a screw, means for rotating the same, a nut coöperating with said screw, said nut being held against rotation but longitudinally movable and having certain threads making a running fit with said screw and certain other threads coöperating with the screw threads and having clearances therebetween adapted to receive the strip to helically form and bend the transverse section of the strip, said nut also having bending channels at the bases of the threads adapted to receive the edges of adjacent convolutions and interfold the same.

22. In an apparatus for forming a tube from a strip the combination of relatively movable members consisting of a nut and coöperating screw, means for rotating one of said members, the other of said members being held against rotation but longitudinally movable, certain coöperating threads of said nut and screw having a running fit and certain other coöperating threads of said nut and screw having clearances therebetween adapted to receive the strip to helically form and bend the same longitudinally of the tube.

23. In an apparatus for forming a flexible tube from a strip, the combination with means for helically coiling the strip, of means for bending the edges of adjacent convolutions into interfolded relation as the strip is coiled, and means for forming a groove extending longitudinally of the strip, the said groove being located between and independent of the interfolded parts.

Signed at New York in the county of New York and State of New York this 4th day of September A. D. 1915.

LOUIS H. BRINKMAN.